US006808263B2

United States Patent
Welk et al.

(10) Patent No.: US 6,808,263 B2
(45) Date of Patent: Oct. 26, 2004

(54) PROGRESSIVE SPECTACLE LENS PRODUCING ONLY SLIGHT DYNAMIC DISTORTION

(75) Inventors: Andrea Welk, Munich (DE); Peter Baumbach, Munich (DE); Walter Haimerl, Munich (DE); Herbert Pfeiffer, Munich (DE); Gregor Esser, Munich (DE); Helmut Altheimer, Lauchdorf (DE); Rainer Dorsch, Munich (DE)

(73) Assignee: Rodenstock GmbH, Munich (DE)

( * ) Notice: Subject to any disclaimer, the term of this patent is extended or adjusted under 35 U.S.C. 154(b) by 47 days.

(21) Appl. No.: 10/280,073

(22) Filed: Oct. 25, 2002

(65) Prior Publication Data

US 2003/0098950 A1 May 29, 2003

Related U.S. Application Data

(63) Continuation of application No. PCT/DE01/01581, filed on Apr. 25, 2001.

(30) Foreign Application Priority Data

| Apr. 25, 2000 | (DE) | 100 20 244 |
| Apr. 25, 2000 | (DE) | 100 20 238 |
| Apr. 28, 2000 | (DE) | 100 21 047 |
| Jan. 17, 2001 | (DE) | 01/00188 |

(51) Int. Cl.[7] ............................................. G02C 7/06
(52) U.S. Cl. ..................................... 351/169; 351/177
(58) Field of Search ................................ 351/168–172, 351/177

(56) References Cited

U.S. PATENT DOCUMENTS

| 4,315,673 A | | 2/1982 | Guilino et al. | |
| 4,606,622 A | | 8/1986 | FueGerhard et al. | ........ 351/169 |
| 5,488,442 A | | 1/1996 | Harsigny et al. | ........... 351/169 |
| 5,510,860 A | * | 4/1996 | Ueno et al. | ................. 351/169 |
| 5,854,669 A | | 12/1998 | Altheimer et al. | .......... 351/169 |

FOREIGN PATENT DOCUMENTS

| DE | 28 14 916 C3 | 4/1978 |
| DE | 28 14 916 A1 | 4/1978 |
| DE | 43 42 234 A1 | 6/1994 |
| WO | 95/27229 | 10/1995 |

OTHER PUBLICATIONS

International Search Report.

* cited by examiner

*Primary Examiner*—Scott J. Sugarman
(74) *Attorney, Agent, or Firm*—Crowell & Moring LLP

(57) ABSTRACT

Described is a spectacle lens comprising a region (distance portion) designed for viewing at large distances and in particular "to infinity"; a region (near portion) designed for viewing at short distances and in particular "reading distances"; and a progressive zone disposed between the distance portion and the near portion, in which the power of the spectacle lens increases from a value at a distance reference point located in the distance portion to a value at a near reference point located in the near portion along a curve (principal line) veering towards the nose. The invention is rendered distinct by a feature, amongst others, according to which trajectories of motion fulfill specific conditions.

7 Claims, 8 Drawing Sheets

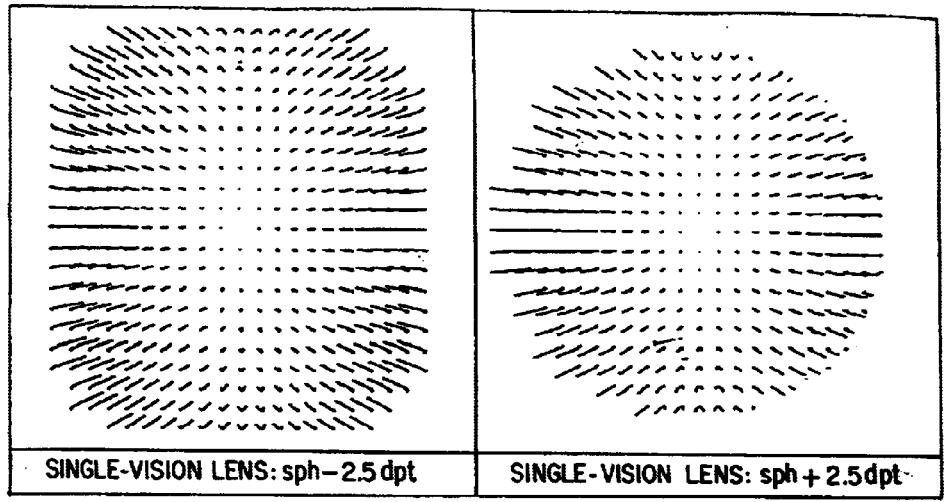
Fig. 1
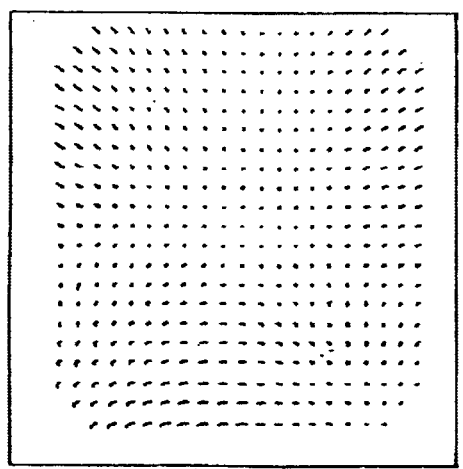   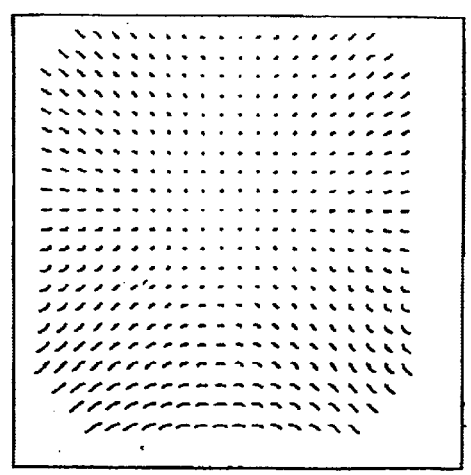
Fig. 2 PRIOR ART    Fig. 3 PRIOR ART

Vertex Heights:

| 0 | -20 | -17.5 | -15 | -12.5 | -10 | -7.5 | -5 | -2.5 | 0 |
|---|---|---|---|---|---|---|---|---|---|
| 20 | 0 | 0 | 0 | 0 | 0 | 0 | 0 | 0 | 1.88114 |
| 17.5 | 0 | 0 | 0 | 0 | 0 | 1.727544 | 1.572749 | 1.476457 | 1.43867 |
| 15 | 0 | 0 | 0 | 1.825893 | 1.556258 | 1.343761 | 1.189465 | 1.093506 | 1.055966 |
| 12.5 | 0 | 0 | 1.827844 | 1.500623 | 1.231244 | 1.019591 | 0.865786 | 0.770078 | 0.732707 |
| 10 | 0 | 0 | 1.558189 | 1.232921 | 0.965089 | 0.754524 | 0.601373 | 0.505935 | 0.468649 |
| 7.5 | 0 | 1.726383 | 1.345574 | 1.022576 | 0.756795 | 0.547868 | 0.39579 | 0.300844 | 0.263672 |
| 5 | 0 | 1.566588 | 1.188478 | 0.868198 | 0.605063 | 0.398525 | 0.248337 | 0.154463 | 0.117588 |
| 2.5 | 0 | 1.459495 | 1.084527 | 0.767617 | 0.508048 | 0.305076 | 0.15802 | 0.066273 | 0.030092 |
| 0 | 1.833183 | 1.402774 | 1.031483 | 0.718726 | 0.463772 | 0.26566 | 0.123183 | 0.035027 | 0.00048 |
| -2.5 | 0 | 1.394456 | 1.027487 | 0.719736 | 0.470458 | 0.278427 | 0.141793 | 0.058484 | 0.026833 |
| -5 | 0 | 1.432945 | 1.070942 | 0.768862 | 0.525984 | 0.340808 | 0.210844 | 0.133162 | 0.105213 |
| -7.5 | 0 | 1.51707 | 1.160674 | 0.864715 | 0.628528 | 0.450405 | 0.32724 | 0.255205 | 0.230946 |
| -10 | 0 | 0 | 1.296365 | 1.00678 | 0.777293 | 0.605921 | 0.488983 | 0.42183 | 0.400599 |
| -12.5 | 0 | 0 | 1.479087 | 1.195879 | 0.972726 | 0.807223 | 0.695213 | 0.631598 | 0.61234 |
| -15 | 0 | 0 | 0 | 1.43296 | 1.214957 | 1.053701 | 0.944992 | 0.883608 | 0.86536 |
| -17.5 | 0 | 0 | 0 | 0 | 0 | 1.344445 | 1.237531 | 1.177299 | 1.159499 |
| -20 | 0 | 0 | 0 | 0 | 0 | 0 | 0 | 0 | 1.494969 |

| 0 | 2.5 | 5 | 7.5 | 10 | 12.5 | 15 | 17.5 | 20 |
|---|---|---|---|---|---|---|---|---|
| 20 | 0 | 0 | 0 | 0 | 0 | 0 | 0 | 0 |
| 17.5 | 1.459338 | 1.538288 | 1.675159 | 0 | 0 | 0 | 0 | 0 |
| 15 | 1.076827 | 1.155872 | 1.292618 | 1.4865 | 1.737064 | 0 | 0 | 0 |
| 12.5 | 0.753727 | 0.832805 | 0.969293 | 1.162491 | 1.41186 | 1.717203 | 0 | 0 |
| 10 | 0.489795 | 0.568789 | 0.704732 | 0.896843 | 1.144544 | 1.447722 | 0 | 0 |
| 7.5 | 0.28482 | 0.36345 | 0.498312 | 0.688619 | 0.933952 | 1.234434 | 1.590531 | 0 |
| 5 | 0.138583 | 0.216248 | 0.349126 | 0.536661 | 0.778744 | 1.075794 | 1.428451 | 0 |
| 2.5 | 0.050725 | 0.126539 | 0.256119 | 0.439446 | 0.677017 | 0.969632 | 1.318088 | 0 |
| 0 | 0.020498 | 0.093392 | 0.218221 | 0.395724 | 0.62728 | 0.914254 | 1.257604 | 1.658066 |
| -2.5 | 0.046199 | 0.115437 | 0.23443 | 0.404667 | 0.628679 | 0.908687 | 1.245883 | 0 |
| -5 | 0.124484 | 0.189993 | 0.302891 | 0.46531 | 0.680802 | 0.952663 | 1.282563 | 0 |
| -7.5 | 0.250899 | 0.313413 | 0.420938 | 0.576172 | 0.783244 | 1.046462 | 1.368183 | 0 |
| -10 | 0.421421 | 0.482323 | 0.585923 | 0.735457 | 0.935213 | 1.190203 | 0 | 0 |
| -12.5 | 0.633866 | 0.694298 | 0.795689 | 0.941459 | 1.135746 | 1.383841 | 0 | 0 |
| -15 | 0.887307 | 0.974892 | 1.048564 | 1.192212 | 1.38304 | 0 | 0 | 0 |
| -17.5 | 1.181572 | 1.242623 | 1.343387 | 0 | 0 | 0 | 0 | 0 |
| -20 | 0 | 0 | 0 | 0 | 0 | 0 | 0 | 0 |

Fig. 8a

PROGRESSIVE SPECTACLE LENS PRODUCING ONLY SLIGHT DYNAMIC DISTORTION

CROSS REFERENCE TO RELATED APPLICATIONS

The present application is a continuation of International Patent Application No. PCT/DE01/01581, filed Apr. 25, 2001, designating the United States of America, the entire disclosure of which is incorporated herein by reference. Priority is claimed based on German Patent Application No. 100 20 238.1, filed Apr. 25, 2000; German Patent Application No. 100 20 244.6, filed Apr. 25, 2000; German Patent Application No. 100 21 047.3, filed Apr. 28, 2000; and International Application No. PCT/DE01/00188, filed Jan. 17, 2001.

FIELD OF THE INVENTION

The invention relates to a progressive spectacle lens as set out in the preamble of claim 1, the lens producing only slight dynamic distortion.

Progressive spectacle lenses (also called varifocal lenses, multifocal lenses etc.) are usually understood to be spectacle lenses having a different (lower) power in the region through which a spectacles wearer views an object located at a great distance—hereunder referred to as a distance portion—than in the region (near portion) through which the spectacles wearer views a near object. Located between the distance portion and the near portion is the so-called progressive zone in which the power of the spectacle lens continuously increases from that of the distance portion to that of the near portion. The magnitude of the power increase is also designated as addition power.

As a rule, the distance portion is located in the upper part of the spectacle lens and is designed for viewing "to infinity", whilst the near portion is located in the lower region and is particularly designed for reading. In spectacles for special applications—those for pilots or for monitor work stations are mentioned as examples—the distance and near portions may also be arranged differently and/or designed for other distances. Furthermore, it is possible for a plurality of near portions and/or distance portions and suitable progressive zones to be present.

With progressive spectacle lenses having a constant refractive index it is necessary, in order that the power may increase between the distance portion and the near portion, that the curvature of one or both surfaces continuously change from the distance portion to the near portion.

The surfaces of spectacle lenses are usually characterized by the so-called principal radii of curvature R1 and R2 at every point on the surface. (Sometimes also the so-called principal curvatures K1=1/R1 and K2=1/R2 are given instead of the principal radii of curvature.) Together with the refractive index n of the glass material, the principal radii of curvature govern the parameters frequently used for an ophthalmologic characterization of a surface:

Surface power=$0.5 \cdot (n-1) \cdot (1/R1+1/R2)$

Surface astigmatism=$(n-1) \cdot (1/R1-1/R2)$.

Surface power is the parameter via which an increase of power from the distance portion to the near portion is achieved. Surface astigmatism (more clearly termed cylinder power) is a "troublesome property", because an astigmatism—inasmuch as an eye does not have an innate astigmatism to be corrected—which exceeds a value of about 0.5 dpt results in an indistinctly perceived image on the retina.

BACKGROUND OF THE INVENTION

Although any change of the curvature of the surface which is needed to achieve a surface power increase without vision being "disturbed" by surface astigmatism can be attained relatively simply along a (plane or winding) line, considerable "intersections" of surfaces will result alongside this line, leading to a large surface astigmatism which more or less impairs the lens in regions alongside the mentioned line.

Furthermore, the strong variation of the prismatic powers results in dynamic distortion effects, the cause of which will be explained in the following:

For this, the image of a group G of n pairs of different object points P(x, y) which are located in a plane at a distance s in front of the spectacle lens will be considered. Without limiting the generality, these shall be disposed in the form of a grid having equal spacings. If these object points P(x, y) are imaged by a spectacle lens in such manner that the principal rays pass through a point Z located on the eye side (for example, the center of rotation of the eye or the entrance pupil of the eye), and if the eye-side principal rays intersect a second plane located at a distance r from the spectacle lens, in the following referred to as a projection plane, then a second group B of points results which are the image points of the object points P(x, y) in the projection plane.

Generally stated, the spectacle lens performs an imaging A from the object plane onto the projection plane in such manner that $A: G \mapsto B$ As a rule, the imaged grid is no longer equally spaced, but warped because of a known image defect which is termed "distortion". When a back-side aperture is present in a path of rays, as is the case with a spectacles wearer, the distortion is cushion-shaped with a single vision positive lens and barrel-shaped with a single vision negative lens. With progressive lenses mixed forms may arise.

According to the invention it has been realized that additional effects arise when a temporal change of the distorted grid $\vec{v}_B$ in the projection plane with translational movements of the object grid $\vec{v}_G$ are considered. The movement of the grids are represented in a usual manner by vector fields for the velocity $\vec{v}(x,y)$. The grid point having the subscript i has the velocity $\vec{v}(x_i, y_i)$.

It must be remarked that within a particular simply configured region each point P(x, y) in the object plane is imaged onto the projection plane. The limitation to a countable finite number of discrete grid points Pi is made only for the sake of graphical clarity. Thus, n may be finite or infinitely large.

When a human eye is confronted with an internally rigid, but moving object grid which has been imaged by a progressive lens, then during the movement the distorted grid will appear to move in the projection plane not only rigidly as a whole. Rather than this, in addition to the expected directed movement caused by the translational movement of the object grid, an undirected component will be observed $\vec{v}_B = \vec{v}_{BDirected} + \vec{v}_{BUndirected}.$ In general, the vector field $\vec{v}_B$ is free neither from divergence nor rotation:

There will be regions in which the density of the grid points increases during the movement $\nabla \cdot \vec{v} > 0$, and others in which it decreases $\nabla \cdot \vec{v} < 0$: the grid will appear to be subjected to a kneading operation.

For rotating movements of glance the following also applies: $\nabla \times \vec{v} \neq 0$.

The dynamic effects are particularly striking when the directed component is subtracted from the total velocity field. All statements made in the present application concerning track curves or trajectories relate to so-called trajectories in a coordinate system of a particular reference point which is the stationary point.

It is expedient to select this marked point to be close to the center of the lens; within the scope of this application and without prejudice to generality, it has the coordinates (0, 0) in the used Cartesian coordinate system which has its origin at the object-side vertex of the spectacle lens. The z axis is directed along the direction of light. The surface-perpendicular vectors of the mentioned planes have only one z component.

To describe the movement of the object points arranged in the form of an equally spaced grid, in the following the trajectories of the undirected components of the grid points during a horizontal periodic movement of the object grid will be considered. The track curve of an arbitrarily chosen object point will then be a horizontal straight line, and that of the conjugated image point will be a curve lying in a plane. This curve is characterized by the variation of the prismatic power (or the prismatic secondary effect) along the principal rays generating the curve.

The horizontal movements of glance discussed here frequently occur, for example during reading, when driving a car, or when working with a computer.

For a single-vision lens having vanishing power the undirected component is equal to zero. The trajectories degenerate to points. The condition of the grid is stationary.

In the general case of non-vanishing power, single-vision lenses have the characteristics shown in FIG. 1. In the left-hand partial illustration the trajectories of a horizontal movement are illustrated for a negative lens having a spherical power of −2.5 dpt, and in the right-hand partial illustration for a positive lens having a spherical power of +2.5 dpt.

The stationary point at the center, to which the undirected velocity component of the imaged grid is referred, can be seen.

On the right and left of this stationary point are purely horizontal tracks having a vanishing vertical component: with a purely horizontal movement of glance only the horizontal component of the prismatic secondary effects varies along the trajectories in this region; the vertical component—and with it the slope of the track curves—is equal to zero.

The length of the plotted trajectories monotonously increases from the stationary point outwards in the radial direction—as also does the prismatic secondary effect.

When moving upwards or downwards from the stationary point, an increasing curvature of the track curves may also be discerned. This results because the vertical deflection of the principal rays during a movement varies more strongly than it does further inwards. The position of the centers of curvature correlates with the distortion.

An inwardly directed opening of the curves (towards the center of the lens) signifies a barrel-shaped distortion, whilst an outwardly directed opening signifies a cushion-shaped distortion.

With progressive spectacle lenses the features of the trajectories for single vision lenses are noticeably changed by the power increase of progressive spectacle lenses.

FIGS. 2, 3, 4 and 5 show trajectories of spectacle lenses on the market; these appear to have been constructed in accordance with the following patent publications:

FIG. 5 U.S. Pat. No. 4,606,622 or DE 196 12 177.

FIGS. 2 to 5 show right-hand side lenses which are on the market; these have the prescription sph +0.5 dpt, cyl 0, Add 2.0 dpt, Pr 0 (all plots were computed for r=0 mm and s=40 mm).

The trajectories of a relatively old progressive spectacle lens shown in FIG. 2 differ from those of all other shown lenses by being, in the bottom half, very short, extremely curved trajectories. A large number are even retrograde, i.e. with the horizontal movements of glance described here, many points appear to move at first with, and later counter to the direction of movement of the objects. This produces serious "swaying sensations", and the objects appear to be strongly dynamically distorted.

For computing a progressive surface in the wearing position, a wearing situation is established. This relates either to a particular user for whom the individual parameters have been specially determined in the respective wearing situation and the progressive surface has been separately computed and fabricated, or to average values as described in DIN 58 208, Part 2.

DESCRIPTION OF THE INVENTION

The invention is based on the object of further developing a progressive spectacle lens as set out in the preamble of patent claim 1 in such manner that the dynamic distortion which of necessity arises with progressive spectacle lenses has been minimized to the extent that it is no longer felt to be disturbing by a spectacles wearer.

An achievement of this object in accordance with the invention is set out in the patent claims.

According to the invention, to minimize a dynamic distortion, track curves (trajectories relative to a stationary point at (0, 0)) formed by connecting points of intersection of image-side principal rays passing through a center of rotation of an eye with a projection plane at a distance s from an object-side vertex of the spectacle lens, when horizontally moving objects having coordinates (x−dx, y, s) at a beginning of a movement and (x+dx, y, s) at an end of a movement are imaged through the progressive spectacle lens with r=0 mm, s=−40 mm and dx=35 mm, satisfy the following condition:

The absolute value of a difference between a minimum and a maximum y coordinate of a trajectory is smaller than a value H given in the following table:

| Sph = −4.0 dpt, Add = 1.0 dpt | | | | |
|---|---|---|---|---|
| | Y = −5 mm | | | |
| X [mm] | −30.0000 | −20.0000 | 20.0000 | 30.0000 |
| H [mm] | 0.1856 | 0.1233 | 0.0917 | 0.1602 |

-continued

| | Y = −10 mm | | | |
|---|---|---|---|---|
| X [mm] | −30.0000 | −20.0000 | 20.0000 | 30.0000 |
| H [mm] | 0.5294 | 0.3639 | 0.2681 | 0.4506 |
| Sph = −4.0 dpt, Add = 2.0 dpt | | | | |
| | Y = −5 mm | | | |
| X [mm] | −30.0000 | −20.0000 | 20.0000 | 30.0000 |
| H [mm] | 0.0578 | 0.0320 | 0.0032 | 0.0354 |
| | Y = −10 mm | | | |
| x [mm] | −30.0000 | −20.0000 | 20.0000 | 30.0000 |
| H [mm] | 0.3601 | 0.2496 | 0.1334 | 0.2765 |
| Sph = −4.0 dpt, Add = 3.0 dpt | | | | |
| | y = −5 mm | | | |
| x [mm] | −30.0000 | −20.0000 | 20.0000 | 30.0000 |
| H [mm] | 0.0764 | 0.0648 | 0.0919 | 0.0754 |
| | y = −10 mm | | | |
| x [mm] | −30.0000 | −20.0000 | 20.0000 | 30.0000 |
| H [mm] | 0.1425 | 0.1088 | 0.0297 | 0.0702 |
| Sph = 0.5 dpt, Add = 1.0 dpt | | | | |
| | y = −5 mm | | | |
| x [mm] | −30.0000 | −20.0000 | 20.0000 | 30.0000 |
| H [mm] | 0.2399 | 0.1645 | 0.1494 | 0.2164 |
| | y = −10 mm | | | |
| x [mm] | −30.0000 | −20.0000 | 20.0000 | 30.0000 |
| H [mm] | 0.4250 | 0.2887 | 0.2684 | 0.3859 |
| Sph = 0.5 dpt, Add = 2.0 dpt | | | | |
| | y = −5 mm | | | |
| x [mm] | −30.0000 | −20.0000 | 20.0000 | 30.0000 |
| H [mm] | 0.4535 | 0.3059 | 0.2945 | 0.4156 |
| | y = −10 mm | | | |
| x [mm] | −30.0000 | −20.0000 | 20.0000 | 30.0000 |
| H [mm] | 0.7102 | 0.4717 | 0.4802 | 0.6734 |
| Sph = 0.5 dpt, Add = 3.0 dpt | | | | |
| | y = −5 mm | | | |
| x [mm] | −30.0000 | −20.0000 | 20.0000 | 30.0000 |
| H [mm] | 0.7038 | 0.4646 | 0.4508 | 0.6353 |
| | y = −10 mm | | | |
| x [mm] | −30.0000 | −20.0000 | 20.0000 | 30.0000 |
| H [mm] | 1.0653 | 0.6846 | 0.7621 | 1.0458 |
| Sph = +5.0 dpt, Add = 1.0 dpt | | | | |
| | y = −5 mm | | | |
| x [mm] | −30.0000 | −20.0000 | 20.0000 | 30.0000 |
| H [mm] | 0.8607 | 0.5828 | 0.4944 | 0.7478 |
| | y = −10 mm | | | |
| x [mm] | −30.0000 | −20.0000 | 20.0000 | 30.0000 |
| H [mm] | 11.6223 | 1.2440 | 1.0375 | 1.5808 |
| Sph = +5.0 dpt, Add = 2.0 dpt | | | | |
| | y = −5 mm | | | |
| x [mm] | −30.0000 | −20.0000 | 20.0000 | 30.0000 |
| H [mm] | 1.1921 | 0.7903 | 0.7106 | 1.0740 |
| | y = −10 mm | | | |
| x [mm] | −30.0000 | −20.0000 | 20.0000 | 30.0000 |
| H [mm] | 11.3204 | 1.5119 | 1.3512 | 2.0477 |
| Sph = +5.0 dpt, Add = 3.0 dpt | | | | |
| | y = −5 mm | | | |
| x [mm] | −30.0000 | −20.0000 | 20.0000 | 30.0000 |
| H [mm] | 1.6290 | 1.0524 | 0.9997 | 1.4771 |
| | y = −10 mm | | | |
| x [mm] | −30.0000 | −20.0000 | 20.0000 | 30.0000 |
| H [mm] | 10.9637 | 1.8600 | 1.8110 | 2.6494 |

Alternatively or additionally the arc length of the trajectory may be shorter than the value L given in the following table:

| Sph = −4.0 dpt, Add = 1.0 dpt | | | | |
|---|---|---|---|---|
| | y = −5 mm | | | |
| x [mm] | −30.0000 | −20.0000 | 20.0000 | 30.0000 |
| L [mm] | 1.5909 | 0.9767 | 0.9266 | 1.4663 |
| | y = −10 mm | | | |
| x [mm] | −30.0000 | −20.0000 | 20.0000 | 30.0000 |
| L [mm] | 1.8098 | 1.1431 | 1.1008 | 1.6803 |
| Sph = −4.0 dpt, Add = 2.0 dpt | | | | |
| | y = −5 mm | | | |
| x [mm] | −30.0000 | −20.0000 | 20.0000 | 30.0000 |
| L [mm] | 1.6783 | 1.0503 | 1.0222 | 1.5680 |
| | y = −10 mm | | | |
| x [mm] | −30.0000 | −20.0000 | 20.0000 | 30.0000 |
| L [mm] | 1.8182 | 1.1592 | 1.1855 | 1.7506 |
| Sph = −4.0 dpt, Add = 3.0 dpt | | | | |
| | y = −5 mm | | | |
| x [mm] | −30.0000 | −20.0000 | 20.0000 | 30.0000 |
| L [mm] | 1.7463 | 1.1216 | 1.1184 | 1.6751 |
| | y = −10 mm | | | |
| x [mm] | −30.0000 | −20.0000 | 20.0000 | 30.0000 |
| L [mm] | 1.8358 | 1.2066 | 1.3027 | 1.8575 |
| Sph = 0.5 dpt, Add = 1.0 dpt | | | | |
| | y = −5 mm | | | |
| x [mm] | −30.0000 | −20.0000 | 20.0000 | 30.0000 |
| L [mm] | 0.6897 | 0.4330 | 0.3721 | 0.5844 |
| | y = −10 mm | | | |
| x [mm] | −30.0000 | −20.0000 | 20.0000 | 30.0000 |
| L [mm] | 0.8672 | 0.6191 | 0.4724 | 0.6851 |
| Sph = 0.5 dpt, Add = 2.0 dpt | | | | |
| | y = −5 mm | | | |
| x [mm] | −30.0000 | −20.0000 | 20.0000 | 30.0000 |
| L [mm] | 0.9082 | 0.5691 | 0.4604 | 0.7418 |
| | y = −10 mm | | | |
| x [mm] | −30.0000 | −20.0000 | 20.0000 | 30.0000 |
| L [mm] | 1.3123 | 0.9671 | 0.7530 | 0.9919 |
| Sph = 0.5 dpt, Add = 3.0 dpt | | | | |

-continued

| | y = −5 mm | | | |
|---|---|---|---|---|
| x [mm] | −30.0000 | −20.0000 | 20.0000 | 30.0000 |
| L [mm] | 1.2493 | 0.8136 | 0.6038 | 0.9704 |
| | y = −10 mm | | | |
| x [mm] | −30.0000 | −20.0000 | 20.0000 | 30.0000 |
| L [mm] | 1.9289 | 1.4589 | 1.1334 | 1.4221 |

Sph = +5.0 dpt, Add = 1.0 dpt

| | y = −5 mm | | | |
|---|---|---|---|---|
| x [mm] | −30.0000 | −20.0000 | 20.0000 | 30.0000 |
| L [mm] | 3.7402 | 2.2660 | 2.0300 | 3.2926 |
| | y = −10 mm | | | |
| x [mm] | −30.0000 | −20.0000 | 20.0000 | 30.0000 |
| L [mm] | 17.0238 | 2.8339 | 2.3619 | 3.7662 |

Sph = +5.0 dpt, Add = 2.0 dpt

| | y = −5 mm | | | |
|---|---|---|---|---|
| x [mm] | −30.0000 | −20.0000 | 20.0000 | 30.0000 |
| L [mm] | 4.1363 | 2.4717 | 2.1643 | 3.6054 |
| | y = −10 mm | | | |
| x [mm] | −30.0000 | −20.0000 | 20.0000 | 30.0000 |
| L [mm] | 17.7989 | 3.2727 | 2.6076 | 4.2396 |

Sph = +5.0 dpt, Add = 3.0 dpt

| | y = −5 mm | | | |
|---|---|---|---|---|
| x [mm] | −30.0000 | −20.0000 | 20.0000 | 30.0000 |
| L [mm] | 4.6985 | 2.8115 | 2.3838 | 3.9886 |
| | y = −10 mm | | | |
| x [mm] | −30.0000 | −20.0000 | 20.0000 | 30.0000 |
| L [mm] | 19.1536 | 3.9888 | 3.0181 | 4.7864 |

Preferably or alternatively the mean gradient of the trajectory may be smaller than the value m given in the following table:

Sph = −4.0 dpt, Add = 1.0 dpt

| | y = −5 mm | | | |
|---|---|---|---|---|
| x [mm] | −30.0000 | −20.0000 | 20.0000 | 30.0000 |
| m | 0.1504 | 0.2091 | −0.2338 | −0.1701 |
| | y = −10 mm | | | |
| x [mm] | −30.0000 | −20.0000 | 20.0000 | 30.0000 |
| m | 0.3796 | 0.5037 | −0.4935 | −0.4012 |

Sph = −4.0 dpt, Add = 2.0 dpt

| | y = −5 mm | | | |
|---|---|---|---|---|
| x [mm] | −30.0000 | −20.0000 | 20.0000 | 30.0000 |
| m | 0.0486 | 0.0601 | 0.0086 | −0.0375 |
| | y = −10 mm | | | |
| x [mm] | −30.0000 | −20.0000 | 20.0000 | 30.0000 |
| m | 0.2906 | 0.4609 | −0.3178 | −0.2642 |

Sph = −4.0 dpt, Add = 3.0 dpt

| | y = −5 mm | | | |
|---|---|---|---|---|
| x [mm] | −30.0000 | −20.0000 | 20.0000 | 30.0000 |
| m | −0.0698 | −0.1448 | 0.2513 | 0.0771 |
| | y = −10 mm | | | |
| x [mm] | −30.0000 | −20.0000 | 20.0000 | 30.0000 |
| m | 0.1408 | 0.3482 | 0.0943 | −0.0701 |

Sph = 0.5 dpt, Add = 1.0 dpt

| | y = −5 mm | | | |
|---|---|---|---|---|
| x [mm] | −30.0000 | −20.0000 | 20.0000 | 30.0000 |
| m | 0.4286 | 0.5223 | −0.8628 | −0.6280 |
| | y = −10 mm | | | |
| x [mm] | −30.0000 | −20.0000 | 20.0000 | 30.0000 |
| m | 0.5658 | 0.5608 | −0.7568 | −0.7614 |

Sph = 0.5 dpt, Add = 2.0 dpt

| | y = −5 mm | | | |
|---|---|---|---|---|
| x [mm] | −30.0000 | −20.0000 | 20.0000 | 30.0000 |
| m | 0.6271 | 0.7017 | −1.2670 | −1.0635 |
| | y = −10 mm | | | |
| x [mm] | −30.0000 | −20.0000 | 20.0000 | 30.0000 |
| m | 0.6496 | 0.5786 | −0.8596 | −0.9913 |

Sph = 0.5 dpt, Add = 3.0 dpt

| | y = −5 mm | | | |
|---|---|---|---|---|
| x [mm] | −30.0000 | −20.0000 | 20.0000 | 30.0000 |
| m | 0.7248 | 0.7639 | −1.5740 | −1.4026 |
| | y = −10 mm | | | |
| x [mm] | −30.0000 | −20.0000 | 20.0000 | 30.0000 |
| m | 0.6752 | 0.5619 | −0.9717 | −1.1853 |

Sph = +5.0 dpt, Add = 1.0 dpt

| | y = −5 mm | | | |
|---|---|---|---|---|
| x [mm] | −30.0000 | −20.0000 | 20.0000 | 30.0000 |
| m | 0.2821 | 0.3767 | −0.5349 | −0.3554 |
| | y = −10 mm | | | |
| x [mm] | −30.0000 | −20.0000 | 20.0000 | 30.0000 |
| m | −2.0435 | 0.5602 | −0.6714 | −0.5836 |

Sph = +5.0 dpt, Add = 2.0 dpt

| | y = −5 mm | | | |
|---|---|---|---|---|
| x [mm] | −30.0000 | −20.0000 | 20.0000 | 30.0000 |
| m | 0.3463 | 0.4457 | −0.6708 | −0.4628 |
| | y = −10 mm | | | |
| x [mm] | −30.0000 | −20.0000 | 20.0000 | 30.0000 |
| m | −1.8039 | 0.5635 | −0.7148 | −0.6528 |

Sph = +5.0 dpt, Add = 3.0 dpt

| | y = −5 mm | | | |
|---|---|---|---|---|
| x [mm] | −30.0000 | −20.0000 | 20.0000 | 30.0000 |
| m | 0.4117 | 0.5009 | −0.8530 | −0.5979 |
| | y = −10 mm | | | |
| x [mm] | −30.0000 | −20.0000 | 20.0000 | 30.0000 |
| m | −1.5811 | 0.5560 | −0.8075 | −0.7671 |

Preferably or alternatively the maximum gradient of the trajectory may be smaller than the value M given in the following table:

| Sph = −4.0 dpt, Add = 1.0 dpt | | | |
|---|---|---|---|
| y = −10 mm | | | |
| x [mm] | −30.0000 | −20.0000 | 20.0000 | 30.0000 |
| M | 6.7715 | 0.7457 | −0.4274 | −0.5090 |

| Sph = −4.0 dpt, Add = 2.0 dpt | | | |
|---|---|---|---|
| y = −10 mm | | | |
| x [mm] | −30.0000 | −20.0000 | 20.0000 | 30.0000 |
| M | 0.2870 | 0.4403 | 0.1951 | −0.3184 |

| Sph = −4.0 dpt, Add = 3.0 dpt | | | |
|---|---|---|---|
| y = −10 mm | | | |
| x [mm] | −30.0000 | −20.0000 | 20.0000 | 30.0000 |
| M | 0.2179 | −0.0023 | 1.4361 | 13.7067 |

| Sph = 0.5 dpt, Add = 1.0 dpt | | | |
|---|---|---|---|
| y = −10 mm | | | |
| x [mm] | −30.0000 | −20.0000 | 20.0000 | 30.0000 |
| M | 0.8577 | 0.7249 | −1.1962 | −11.5313 |

| Sph = 0.5 dpt, Add = 2.0 dpt | | | |
|---|---|---|---|
| y = −10 mm | | | |
| x [mm] | −30.0000 | −20.0000 | 20.0000 | 30.0000 |
| M | 0.9196 | 0.9184 | −1.3399 | −2.8994 |

| Sph = 0.5 dpt, Add = 3.0 dpt | | | |
|---|---|---|---|
| y = −10 mm | | | |
| x [mm] | −30.0000 | −20.0000 | 20.0000 | 30.0000 |
| M | 1.0969 | 1.0391 | −1.9120 | −4.9332 |

| Sph = +5.0 dpt, Add = 1.0 dpt | | | |
|---|---|---|---|
| y = −10 mm | | | |
| x [mm] | −30.0000 | −20.0000 | 20.0000 | 30.0000 |
| M | 1.9493 | 6.1058 | −1.9300 | −1.7983 |

| Sph = +5.0 dpt, Add = 2.0 dpt | | | |
|---|---|---|---|
| y = −10 mm | | | |
| x [mm] | −30.0000 | −20.0000 | 20.0000 | 30.0000 |
| M | 2.8737 | 0.8570 | −2.1444 | −9.0899 |

| Sph = +5.0 dpt, Add = 3.0 dpt | | | |
|---|---|---|---|
| y = −10 mm | | | |
| x [mm] | −30.0000 | −20.0000 | 20.0000 | 30.0000 |
| M | 0.8090 | 0.7053 | −7.1729 | −7.8544 |

Furthermore it is of advantage when preferably or alternatively the x coordinate of the center of the trajectory (half the sum of the minimum and the maximum x coordinate) is smaller than the value xz according to the following table:

| Sph = −4.0 dpt, Add = 1.0 dpt | | | |
|---|---|---|---|
| y = −5 mm | | | |
| x [mm] | −30.0000 | −20.0000 | 20.0000 | 30.0000 |
| xz [mm] | −11.3070 | −7.5948 | 7.6229 | 11.3708 |
| y = −10 mm | | | |
| x [mm] | −30.0000 | −20.0000 | 20.0000 | 30.0000 |
| xz [mm] | −11.2191 | −7.5330 | 7.5648 | 11.2896 |

| Sph = −4.0 dpt, Add = 2.0 dpt | | | |
|---|---|---|---|
| y = −5 mm | | | |
| x [mm] | −30.0000 | −20.0000 | 20.0000 | 30.0000 |
| xz [mm] | −11.3556 | −7.6222 | 7.6442 | 11.4147 |
| y = −10 mm | | | |
| x [mm] | −30.0000 | −20.0000 | 20.0000 | 30.0000 |
| xz [mm] | −11.3064 | −7.5867 | 7.6028 | 11.3640 |

| Sph = −4.0 dpt, Add = 3.0 dpt | | | |
|---|---|---|---|
| y = −5 mm | | | |
| x [mm] | −30.0000 | −20.0000 | 20.0000 | 30.0000 |
| xz [mm] | −11.3994 | −7.6451 | 7.6506 | 11.4351 |
| y = −10 mm | | | |
| x [mm] | −30.0000 | −20.0000 | 20.0000 | 30.0000 |
| xz [mm] | −11.3968 | −7.6411 | 7.6255 | 11.4162 |

| Sph = 0.5 dpt, Add = 1.0 dpt | | | |
|---|---|---|---|
| y = −5 mm | | | |
| x [mm] | −30.0000 | −20.0000 | 20.0000 | 30.0000 |
| xz [mm] | −13.7030 | −9.1089 | 9.0833 | 13.6540 |
| y = −10 mm | | | |
| x [mm] | −30.0000 | −20.0000 | 20.0000 | 30.0000 |
| xz [mm] | −13.7736 | −9.1541 | 9.1126 | 13.7117 |

| Sph = 0.5 dpt, Add = 2.0 dpt | | | |
|---|---|---|---|
| y = −5 mm | | | |
| x [mm] | −30.0000 | −20.0000 | 20.0000 | 30.0000 |
| xz [mm] | −13.7989 | −9.1581 | 9.1193 | 13.7287 |
| y = −10 mm | | | |
| x [mm] | −30.0000 | −20.0000 | 20.0000 | 30.0000 |
| xz [mm] | −13.9392 | −9.2439 | 9.1778 | 13.8389 |

| Sph = 0.5 dpt, Add = 3.0 dpt | | | |
|---|---|---|---|
| y = −5 mm | | | |
| x [mm] | −30.0000 | −20.0000 | 20.0000 | 30.0000 |
| xz [mm] | −14.0239 | −9.2904 | 9.2212 | 13.9123 |
| y = −10 mm | | | |
| x [mm] | −30.0000 | −20.0000 | 20.0000 | 30.0000 |
| xz [mm] | −14.2516 | −9.4367 | 9.3185 | 14.0854 |

| Sph = +5.0 dpt, Add = 1.0 dpt | | | |
|---|---|---|---|
| y = −5 mm | | | |
| x [mm] | −30.0000 | −20.0000 | 20.0000 | 30.0000 |
| xz [mm] | −17.3295 | −11.3902 | 11.2874 | 17.1168 |
| y = −10 mm | | | |
| x [mm] | −30.0000 | −20.0000 | 20.0000 | 30.0000 |
| xz [mm] | −12.9054 | −11.5804 | 11.4231 | 17.3537 |

| Sph = +5.0 dpt, Add = 2.0 dpt | | | |
|---|---|---|---|
| y = −5 mm | | | |
| x [mm] | −30.0000 | −20.0000 | 20.0000 | 30.0000 |
| xz [mm] | −17.7640 | −11.6405 | 11.5155 | 17.5159 |
| y = −10 mm | | | |

-continued

| x [mm] | −30.0000 | −20.0000 | 20.0000 | 30.0000 |
|---|---|---|---|---|
| xz [mm] | −12.8237 | −11.8832 | 11.7004 | 17.8471 |

Sph = +5.0 dpt, Add = 3.0 dpt y = −5 mm

| x [mm] | −30.0000 | −20.0000 | 20.0000 | 30.0000 |
|---|---|---|---|---|
| xz [mm] | −18.2779 | −11.9499 | 11.7829 | 17.9519 | y = −10 mm

| x [mm] | −30.0000 | −20.0000 | 20.0000 | 30.0000 |
|---|---|---|---|---|
| xz [mm] | −12.7057 | −12.2789 | 12.0264 | 18.3631 |

Furthermore it is preferred when alternatively or additionally the yx coordinate of the center of the trajectory (half the sum of the minimum and the maximum y coordinate) is smaller than the value yz according to the following table:

Sph = −4.0 dpt, Add = 1.0 dpt y = −5 mm

| x [mm] | −30.0000 | −20.0000 | 20.0000 | 30.0000 |
|---|---|---|---|---|
| yz [mm] | −3.9197 | −3.9560 | −3.9576 | −3.9235 | y = −10 mm

| x [mm] | −30.0000 | −20.0000 | 20.0000 | 30.0000 |
|---|---|---|---|---|
| yz [mm] | −9.7598 | −9.8352 | −9.8493 | −9.7834 |

Sph = −4.0 dpt, Add = 2.0 dpt y = −5 mm

| x [mm] | −30.0000 | −20.0000 | 20.0000 | 30.0000 |
|---|---|---|---|---|
| yz [mm] | −3.9663 | −3.9993 | −3.9887 | −3.9561 | y = −10 mm

| x [mm] | −30.0000 | −20.0000 | 20.0000 | 30.0000 |
|---|---|---|---|---|
| yz [mm] | −9.9049 | −9.9681 | −9.9741 | −9.9176 |

Sph = −4.0 dpt, Add = 3.0 dpt y = −5 mm

| x [mm] | −30.0000 | −20.0000 | 20.0000 | 30.0000 |
|---|---|---|---|---|
| yz [mm] | −4.0196 | −4.0496 | −4.0167 | −3.9821 | y = −10 mm

| x [mm] | −30.0000 | −20.0000 | 20.0000 | 30.0000 |
|---|---|---|---|---|
| yz [mm] | −10.0654 | −10.1113 | −10.0993 | −10.0540 |

Sph = 0.5 dpt, Add = 1.0 dpt y = −5 mm

| x [mm] | −30.0000 | −20.0000 | 20.0000 | 30.0000 |
|---|---|---|---|---|
| yz [mm] | −4.5384 | −4.5218 | −4.5064 | −4.5176 | y = −10 mm

| x [mm] | −30.0000 | −20.0000 | 20.0000 | 30.0000 |
|---|---|---|---|---|
| yz [mm] | −11.3786 | −11.3388 | −11.3147 | −11.3468 |

Sph = 0.5 dpt, Add = 2.0 dpt y = −5 mm

| x [mm] | −30.0000 | −20.0000 | 20.0000 | 30.0000 |
|---|---|---|---|---|
| yz [mm] | −4.6100 | −4.5783 | −4.5450 | −4.5643 | y = −10 mm

| x [mm] | −30.0000 | −20.0000 | 20.0000 | 30.0000 |
|---|---|---|---|---|
| yz [mm] | −11.5798 | −11.5070 | −11.4737 | −11.5325 |

-continued

Sph = 0.5 dpt, Add = 3.0 dpt y = −5 mm

| x [mm] | −30.0000 | −20.0000 | 20.0000 | 30.0000 |
|---|---|---|---|---|
| yz [mm] | −4.7552 | −4.7015 | −4.6287 | −4.6610 | y = −10 mm

| x [mm] | −30.0000 | −20.0000 | 20.0000 | 30.0000 |
|---|---|---|---|---|
| yz [mm] | −11.9218 | −11.8067 | −11.7550 | −11.8468 |

Sph = +5.0 dpt, Add = 1.0 dpt y = −5 mm

| x [mm] | −30.0000 | −20.0000 | 20.0000 | 30.0000 |
|---|---|---|---|---|
| yz [mm] | −5.5028 | −5.4121 | −5.3601 | −5.4312 | y = −10 mm

| x [mm] | −30.0000 | −20.0000 | 20.0000 | 30.0000 |
|---|---|---|---|---|
| yz [mm] | −18.8206 | −13.7124 | −13.6144 | −13.7883 |

Sph = +5.0 dpt, Add = 2.0 dpt y = −5 mm

| x [mm] | −30.0000 | −20.0000 | 20.0000 | 30.0000 |
|---|---|---|---|---|
| yz [mm] | −5.7060 | −5.5826 | −5.5047 | −5.6056 | y = −10 mm

| x [mm] | −30.0000 | −20.0000 | 20.0000 | 30.0000 |
|---|---|---|---|---|
| yz [mm] | −18.9496 | −14.1505 | −14.0444 | −14.2803 |

Sph = +5.0 dpt, Add = 3.0 dpt y = −5 mm

| x [mm] | −30.0000 | −20.0000 | 20.0000 | 30.0000 |
|---|---|---|---|---|
| yz [mm] | −5.9781 | −5.8024 | −5.6754 | −5.8106 | y = −10 mm

| x [mm] | −30.0000 | −20.0000 | 20.0000 | 30.0000 |
|---|---|---|---|---|
| yz [mm] | −19.0922 | −14.6873 | −14.5602 | −14.8518 |

In any case it is preferred that inter- or extrapolated values apply to not listed prescriptions.

BRIEF DESCRIPTION OF THE DRAWINGS

In the following the invention will be described by way of example, without limitation of the general inventive concept, with the aid of embodiments with reference to the drawings to which attention is expressly drawn concerning the disclosure of all details of the invention not described more explicitly in the text.

Shown by

FIG. 1 are the trajectories for spherical spectacle lenses;

FIGS. 2–5 are the trajectories for known progressive spectacle lenses;

FIG. 8a are the vertex heights of the progressive surface of a concrete embodiment;

DESCRIPTION OF EXAMPLES OF EMBODIMENT

Figure 4:
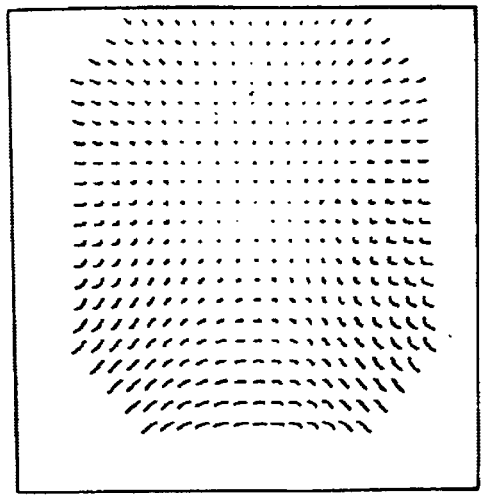
Figure 5:
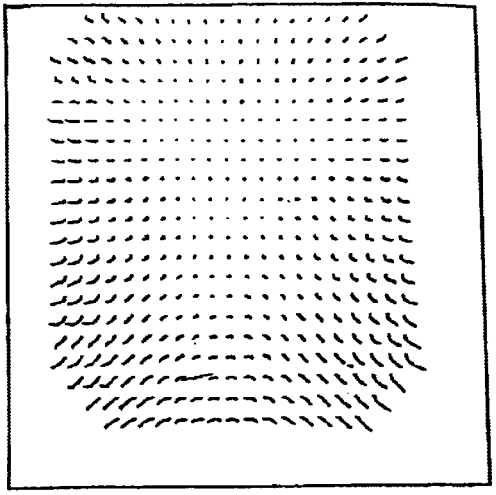
Figure 6:
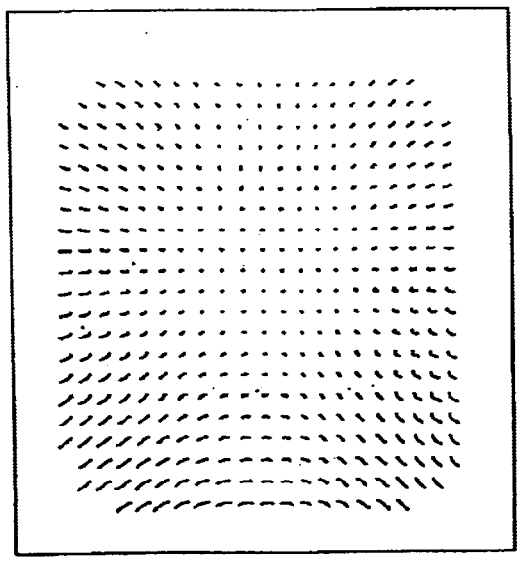
FIG. 6 are the trajectories for a progressive spectacle lens according to the invention.

FIG. 6 shows the trajectories for a spectacle lens according to the invention, having the same optical parameters as the conventional spectacle lenses illustrated in FIGS. 2 to 5. This illustration already shows that the trajectories are substantially shorter than in prior art and moreover extend considerably more distinctly.

Figure 7:
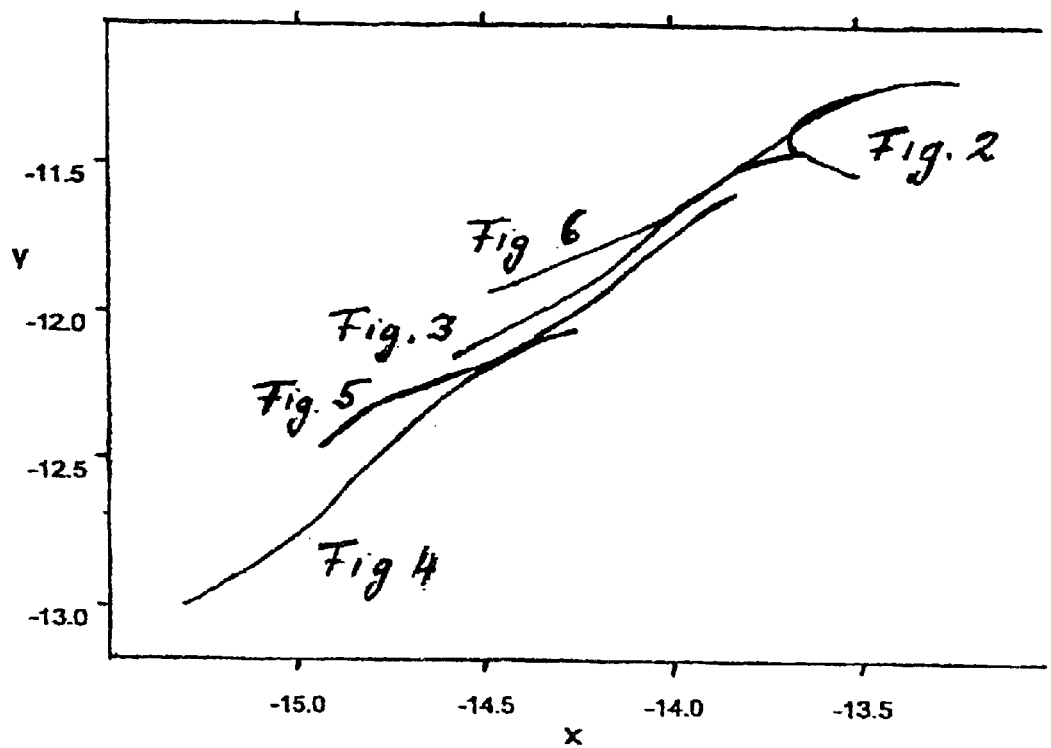
FIG. 7 is an illustration for comparison of the spectacle lens according to the invention with prior art.

This will be set out in greater detail with reference to FIG. 7.

In this illustration the curves for the known progressive spectacle lenses shown in FIGS. 2 to 5 and for the spectacle lens of the invention have been plotted on an enlarged scale, so that the differences between the lenses become much clearer than in the grid plots which serve to provide an overall view and demonstrate the local dependencies in the spectacle lens.

FIG. 7 shows that distinct differences of properties such as length of the (individual) track curves, maximum and minimum gradient of the curves, position, etc. exist. These differences are given in the claims in the form of tables for various powers and addition powers.

By way of example this comparison will be illustrated by means of the trajectories which can be found by starting from the stationary point and counting (5 downwards, 6 to the left). The object point imaged on the center of the trajectory thus has the coordinates (−30 mm, −25 mm, −40 mm). It is moved horizontally by a total of 70 mm, i.e. from the coordinate x=−65 mm to x=5 mm.

The spectacle lens illustrated in FIG. 2 is the "curl" in the top right-hand corner of FIG. 7.

For the spectacle lens illustrated in FIG. 3 the trajectory is distinctly longer than for the spectacle lens illustrated in FIG. 2, however it is elongate and thus does not show the disturbing effects of being retrograde. The curve rises monotonously everywhere. When the gaze is kept fixed on a moving object point whilst the head is kept at rest (or when a corresponding head movement is made whilst the object is stationary), the spectacles wearer must monotonously raise or lower his glance in accordance with the curve. This uniform monotonous movement of the glance is experienced as being more agreeable than that with the retrograde strong curve of the spectacle lens illustrated in FIG. 2.

The spectacle lens illustrated in FIG. 4 has agreeable properties similar to those of the spectacle lens according to FIG. 3. However, it must be noted that the maximum gradient is larger than that according to FIG. 3. To a wearer making a movement of glance, a peripheral object will appear to fall or rise more rapidly in the same time than to a wearer of a spectacle lens according to FIG. 3. If adjacent trajectories are examined, it will become clear that objects also become distorted much more rapidly and that the distortion therefore becomes more noticeable.

Apart from the gradient being greater, it will be noticed that the curve is located at a distinctly lower position than the others. The necessary lowering of the glance is greater than with the other products.

The spectacle lens according to FIG. 5 also has a relatively large gradient.

The spectacle lens of the invention as illustrated in FIG. 6 avoids all the described disadvantages of the other lenses during horizontal movements of glance: The relative trajectories are here distinguished by short length, monotony, and smallest mean and smallest maximum gradient simultaneously with an only slight lowering of the glance.

The progressive spectacle lens of the invention is thus distinguished by the dynamic distortion with horizontal movements of glance and the swaying movements correlated therewith are as small as possible.

The concrete example of embodiment illustrated in FIG. 8 has a spherical power (mean "as worn" power) of −1 dpt and an addition power A of 2 dpt at the distance reference point. An astigmatic prescription is not present. In all Figures the abscissa (x axis) is the horizontal axis and the ordinate (y axis) is the vertical axis in the wearing position.

The distance and the near reference point are each represented by a circle in FIGS. 8b–e, the centration point being designated by a cross.—their positions may be seen in the Figures. Furthermore, the course of the principal line has been plotted.

The partial FIG. 8a indicates the vertex heights of the progressive eye-side surface for the embodiment. Vertex height is understood to be the distance of a point having the coordinates x and y (horizontal and vertical axis, respectively, in the wearing position of the spectacle lens) from the tangential plane of the surface vertex. In the Table each left-hand column shows the y values (from −20 to +20 mm) and the top line from column 2 onwards shows the x values (from −20 to +20 mm). The vertex heights are also given in millimeters. The value 0 means that no vertex height is given for these x,y coordinates.

Figure 8B:
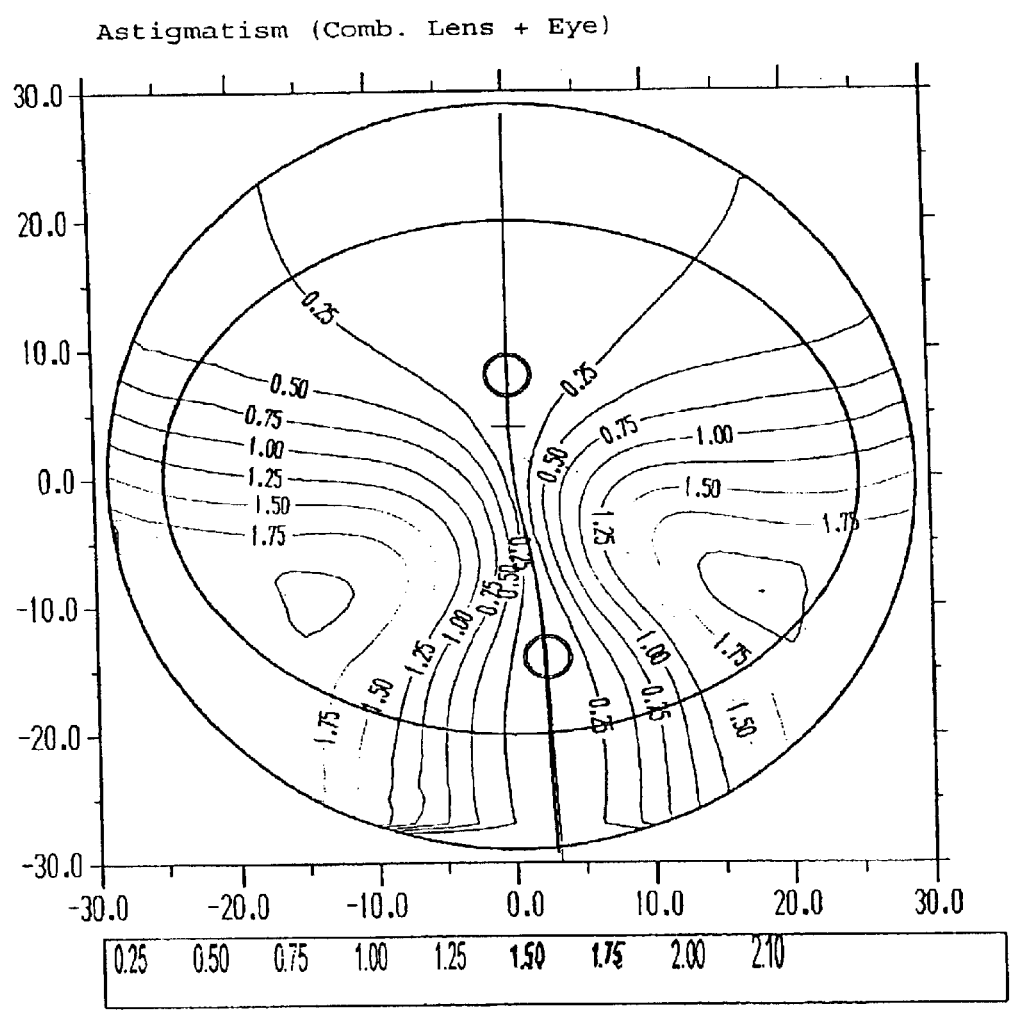
FIG. 8b are the iso-lines of the astigmatic deviation.

The partial FIG. 8b shows the astigmatic deviation within a circle having a radius of 30 mm around a point lying 4 mm below the so-called centration point. The astigmatic deviation is the "residual astigmatism" of the system spectacle lens/eye and is shown by so-called iso-lines beginning with the iso-line 0.25 dpt. The iso-lines indicate the deviation of the astigmatism with respect to magnitude and cylinder axis from the cylindrical prescription—which in the case of an astigmatism-free eye is 0 dpt.

Figure 8C:
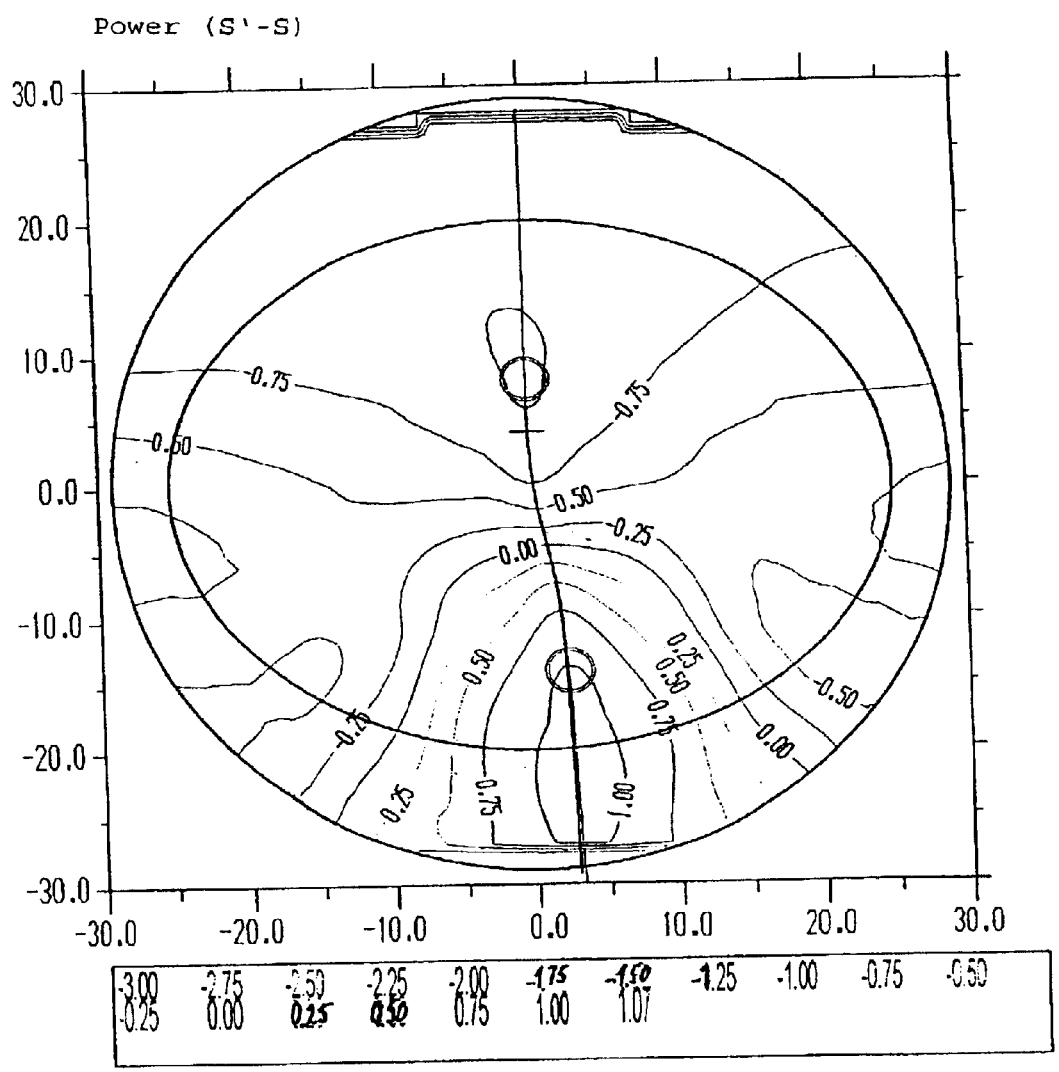
FIG. 8c are the iso-lines of the mean "as worn" power.

The partial FIG. 8c shows the corresponding iso-lines for the mean "as worn" power of this embodiment. The mean "as worn" power D is the mean value of the reciprocals of the image side focal intercepts S'1 and S'2 minus the object distance which is the object side focal intercept S, as given by $$D = 0.5 \cdot (S'1 + S'2) - S$$

and is also illustrated in the form of so-called iso-lines beginning with the iso-line 0.75 dpt.

Figure 8D:
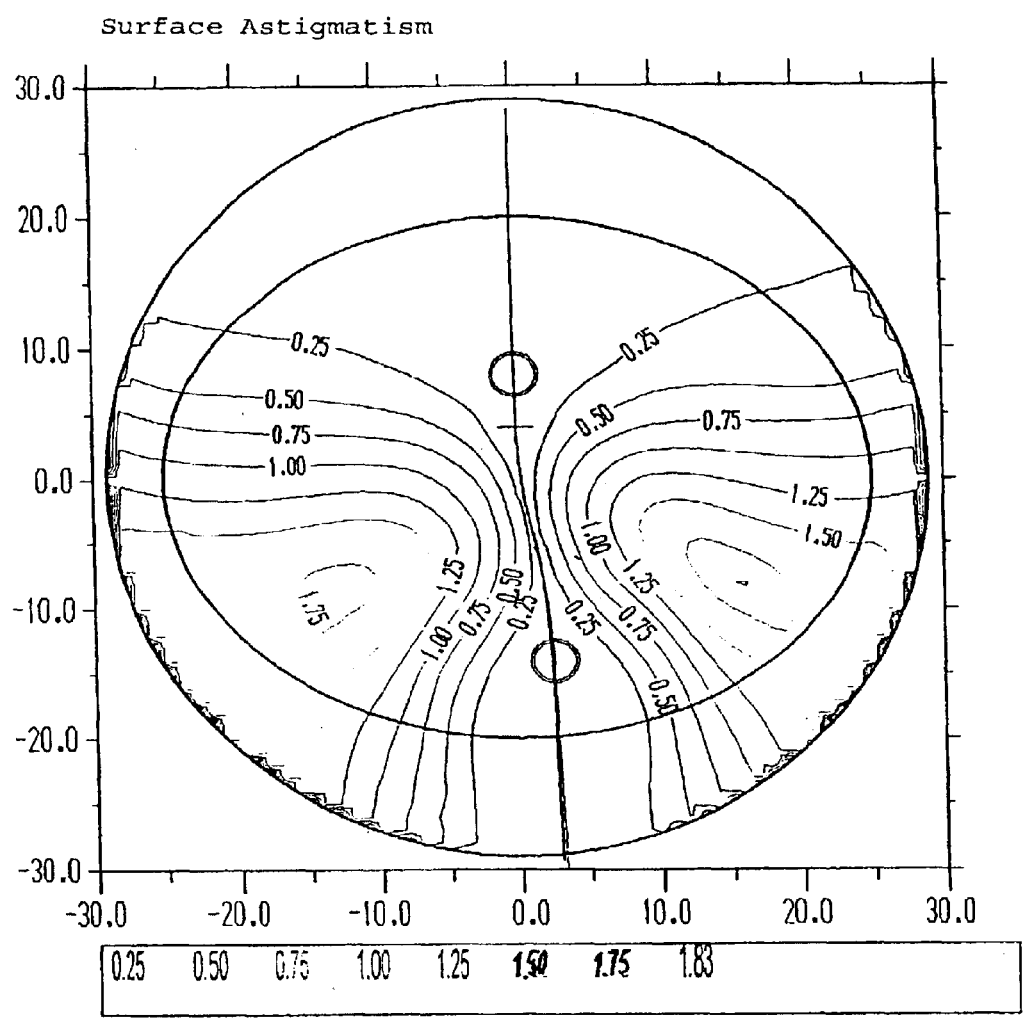
FIG. 8d are the iso-lines of the surface astigmatism.
Figure 8E:
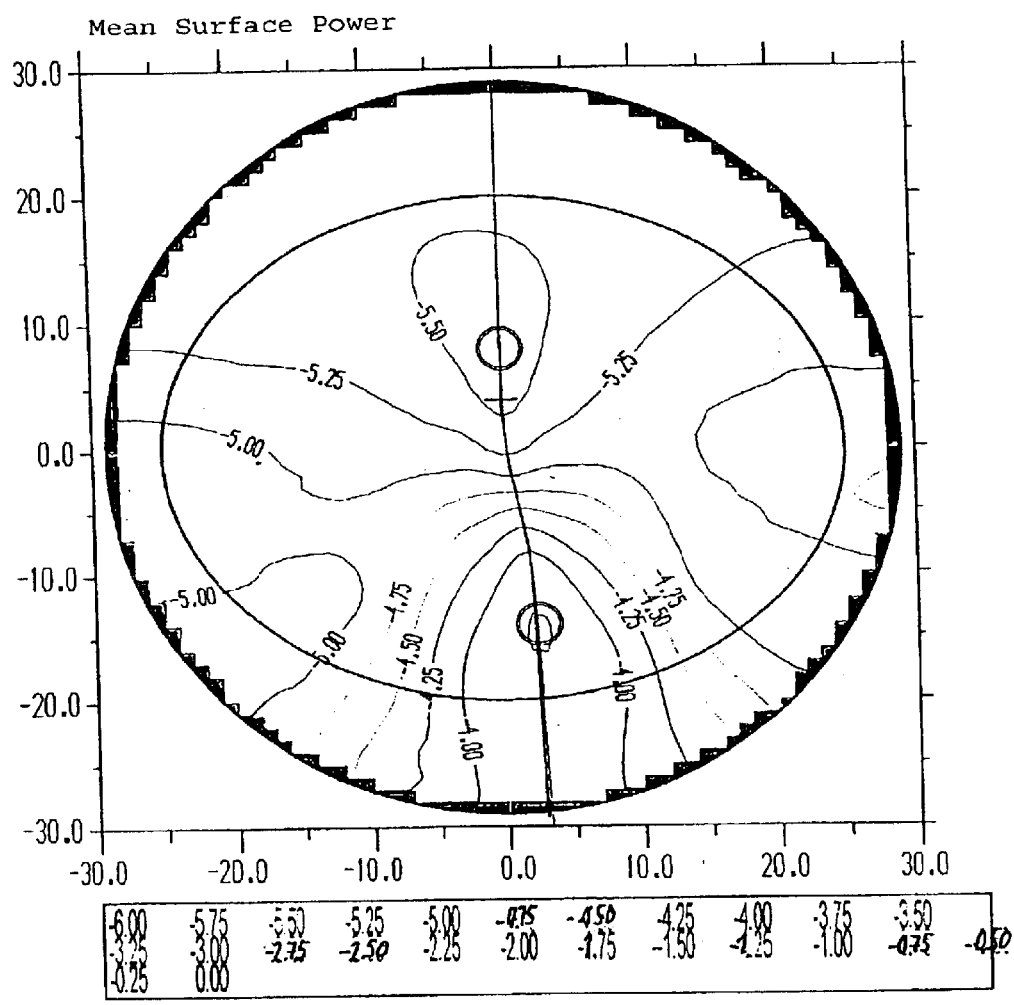
FIG. 8e are the iso-lines of the mean surface power for this embodiment.

In corresponding manner the iso-lines of the surface data, namely the surface astigmatism and the mean surface power, are shown in partial FIGS. 8d and 8e. For a definition of these surface data attention is drawn to the introductory explanations.

The embodiment shown in FIG. 8 has the following individualized conditions of wearing:

| | |
|---|---|
| D1x | 4.55 |
| D1y | 4.55 |
| n | 1.597 |
| d | 1.59 |
| DRP | 1.0 |
| PD | 63 |
| HSA | 15 |
| Pantoscopic Angle | 0 | wherein:

| | |
|---|---|
| D1x | is the surface power of the front surface in x direction (dpt) |
| D1y | is the surface power of the front surface in y direction (dpt) |
| n | is the refractive index of the glass material |
| d | is the center thickness of the lens in mm |
| DRP | is the prism thinning in cm/m |
| PD | is the interpupillary distance in mm |
| HSA | is the vertex distance in mm. |

The pantoscopic angle of the spectacle lens is given in degrees.

Of course, the features of the invention may also be used for computing and manufacturing spectacle lenses having two progressive surfaces and/or having (in addition) a varying refractive index.

What is claimed is:

1. Spectacle lens comprising
   a region (distance portion) designed for viewing at large distances and in particular "to infinity";
   a region (near portion) designed for viewing at short distances and in particular "reading distances"; and
   a progressive zone disposed between the distance portion and the near portion, in which the power of the spectacle lens increases from a value at a distance reference point located in the distance portion to a value at the near reference point located in the near portion along a curve (principal line) veering towards the nose;
   wherein to minimize a dynamic distortion, track curves (trajectories relative to a stationary point at (0, 0)) formed by connecting points of intersection of image-side principal rays passing through a center of rotation of an eye with a projection plane at a distance s from an object-side vertex of the spectacle lens, when horizontally moving objects having coordinates (x−dx, y, s) at a beginning of a movement and (x+dx, y, s) at an end of a movement are imaged through the progressive spectacle lens with r=0 mm, s=−40 mm and dx=35 mm, satisfy the following condition:
   the absolute value of a difference between a minimum and a maximum y coordinate of a trajectory is smaller than a value H given in the following table:

Sph = −4.0 dpt, Add = 1.0 dpt

| | y = −5 mm | | | |
|---|---|---|---|---|
| x [mm] | −30.0000 | −20.0000 | 20.0000 | 30.0000 |
| H [mm] | 0.1856 | 0.1233 | 0.0917 | 0.1602 |
| | y = −10 mm | | | |
| x [mm] | −30.0000 | −20.0000 | 20.0000 | 30.0000 |
| H [mm] | 0.5294 | 0.3639 | 0.2681 | 0.4506 |

Sph = −4.0 dpt, Add = 2.0 dpt

| | y = −5 mm | | | |
|---|---|---|---|---|
| x [mm] | −30.0000 | −20.0000 | 20.0000 | 30.0000 |
| H [mm] | 0.0578 | 0.0320 | 0.0032 | 0.0354 |
| | y = −10 mm | | | |
| x [mm] | −30.0000 | −20.0000 | 20.0000 | 30.0000 |
| H [mm] | 0.3601 | 0.2496 | 0.1334 | 0.2765 |

Sph = −4.0 dpt, Add = 3.0 dpt

| | y = −5 mm | | | |
|---|---|---|---|---|
| x [mm] | −30.0000 | −20.0000 | 20.0000 | 30.0000 |
| H [mm] | 0.0764 | 0.0648 | 0.0919 | 0.0754 |
| | y = −10 mm | | | |
| x [mm] | −30.0000 | −20.0000 | 20.0000 | 30.0000 |
| H [mm] | 0.1425 | 0.1088 | 0.0297 | 0.0702 |

Sph = 0.5 dpt, Add = 1.0 dpt

| | y = −5 mm | | | |
|---|---|---|---|---|
| x [mm] | −30.0000 | −20.0000 | 20.0000 | 30.0000 |
| H [mm] | 0.2399 | 0.1645 | 0.1494 | 0.2164 |
| | y = −10 mm | | | |
| x [mm] | −30.0000 | −20.0000 | 20.0000 | 30.0000 |
| H [mm] | 0.4250 | 0.2887 | 0.2684 | 0.3859 |

Sph = 0.5 dpt, Add = 2.0 dpt

| | y = −5 mm | | | |
|---|---|---|---|---|
| x [mm] | −30.0000 | −20.0000 | 20.0000 | 30.0000 |
| H [mm] | 0.4535 | 0.3059 | 0.2945 | 0.4156 |
| | y = −10 mm | | | |
| x [mm] | −30.0000 | −20.0000 | 20.0000 | 30.0000 |
| H [mm] | 0.7102 | 0.4717 | 0.4802 | 0.6734 |

Sph = 0.5 dpt, Add = 3.0 dpt

| | y = −5 mm | | | |
|---|---|---|---|---|
| x [mm] | −30.0000 | −20.0000 | 20.0000 | 30.0000 |
| H [mm] | 0.7038 | 0.4646 | 0.4508 | 0.6353 |
| | y = −10 mm | | | |
| x [mm] | −30.0000 | −20.0000 | 20.0000 | 30.0000 |
| H [mm] | 1.0653 | 0.6846 | 0.7621 | 1.0458 |

Sph = +5.0 dpt, Add = 1.0 dpt

| | y = −5 mm | | | |
|---|---|---|---|---|
| x [mm] | −30.0000 | −20.0000 | 20.0000 | 30.0000 |
| H [mm] | 0.8607 | 0.5828 | 0.4944 | 0.7478 |
| | y = −10 mm | | | |
| x [mm] | −30.0000 | −20.0000 | 20.0000 | 30.0000 |
| H [mm] | 11.6223 | 1.2440 | 1.0375 | 1.5808 |

Sph = +5.0 dpt, Add = 2.0 dpt

| | y = −5 mm | | | |
|---|---|---|---|---|
| x [mm] | −30.0000 | −20.0000 | 20.0000 | 30.0000 |
| H [mm] | 1.1921 | 0.7903 | 0.7106 | 1.0740 |
| | y = −10 mm | | | |
| x [mm] | −30.0000 | −20.0000 | 20.0000 | 30.0000 |
| H [mm] | 11.3204 | 1.5119 | 1.3512 | 2.0477 |

Sph = +5.0 dpt, Add = 3.0 dpt

| | y = −5 mm | | | |
|---|---|---|---|---|
| x [mm] | −30.0000 | −20.0000 | 20.0000 | 30.0000 |
| H [mm] | 1.6290 | 1.0524 | 0.9997 | 1.4771 |
| | y = −10 mm | | | |
| x [mm] | −30.0000 | −20.0000 | 20.0000 | 30.0000 |
| H [mm] | 10.9637 | 1.8600 | 1.8110 | 2.6494 |

2. Spectacle lens according to claim 1, wherein an arc length of the trajectory is shorter than a value L given in the following table:

| Sph = −4.0 dpt, Add = 1.0 dpt | | | | |
|---|---|---|---|---|
| y = −5 mm | | | | |
| x [mm] | −30.0000 | −20.0000 | 20.0000 | 30.0000 |
| L [mm] | 1.5909 | 0.9767 | 0.9266 | 1.4663 |
| y = −10 mm | | | | |
| x [mm] | −30.0000 | −20.0000 | 20.0000 | 30.0000 |
| L [mm] | 1.8098 | 1.1431 | 1.1008 | 1.6803 |

| Sph = −4.0 dpt, Add = 2.0 dpt | | | | |
|---|---|---|---|---|
| y = −5 mm | | | | |
| x [mm] | −30.0000 | −20.0000 | 20.0000 | 30.0000 |
| L [mm] | 1.6783 | 1.0503 | 1.0222 | 1.5680 |
| y = −10 mm | | | | |
| x [mm] | −30.0000 | −20.0000 | 20.0000 | 30.0000 |
| L [mm] | 1.8182 | 1.1592 | 1.1855 | 1.7506 |

| Sph = −4.0 dpt, Add = 3.0 dpt | | | | |
|---|---|---|---|---|
| y = −5 mm | | | | |
| x [mm] | −30.0000 | −20.0000 | 20.0000 | 30.0000 |
| L [mm] | 1.7463 | 1.1216 | 1.1184 | 1.6751 |
| y = −10 mm | | | | |
| x [mm] | −30.0000 | −20.0000 | 20.0000 | 30.0000 |
| L [mm] | 1.8358 | 1.2066 | 1.3027 | 1.8575 |

| Sph = 0.5 dpt, Add = 1.0 dpt | | | | |
|---|---|---|---|---|
| y = −5 mm | | | | |
| x [mm] | −30.0000 | −20.0000 | 20.0000 | 30.0000 |
| L [mm] | 0.6897 | 0.4330 | 0.3721 | 0.5844 |
| y = −10 mm | | | | |
| x [mm] | −30.0000 | −20.0000 | 20.0000 | 30.0000 |
| L [mm] | 0.8672 | 0.6191 | 0.4724 | 0.6851 |

| Sph = 0.5 dpt, Add = 2.0 dpt | | | | |
|---|---|---|---|---|
| y = −5 mm | | | | |
| x [mm] | −30.0000 | −20.0000 | 20.0000 | 30.0000 |
| L [mm] | 0.9082 | 0.5691 | 0.4604 | 0.7418 |
| y = −10 mm | | | | |
| x [mm] | −30.0000 | −20.0000 | 20.0000 | 30.0000 |
| L [mm] | 1.3123 | 0.9671 | 0.7530 | 0.9919 |

| Sph = 0.5 dpt, Add = 3.0 dpt | | | | |
|---|---|---|---|---|
| y = −5 mm | | | | |
| x [mm] | −30.0000 | −20.0000 | 20.0000 | 30.0000 |
| L [mm] | 1.2493 | 0.8136 | 0.6038 | 0.9704 |
| y = −10 mm | | | | |
| x [mm] | −30.0000 | −20.0000 | 20.0000 | 30.0000 |
| L [mm] | 1.9289 | 1.4589 | 1.1334 | 1.4221 |

| Sph = +5.0 dpt, Add = 1.0 dpt | | | | |
|---|---|---|---|---|
| y = −5 mm | | | | |
| x [mm] | −30.0000 | −20.0000 | 20.0000 | 30.0000 |
| L [mm] | 3.7402 | 2.2660 | 2.0300 | 3.2926 |
| y = −10 mm | | | | |
| x [mm] | −30.0000 | −20.0000 | 20.0000 | 30.0000 |
| L [mm] | 17.0238 | 2.8339 | 2.3619 | 3.7662 |

| Sph = +5.0 dpt, Add = 2.0 dpt | | | | |
|---|---|---|---|---|
| y = −5 mm | | | | |
| x [mm] | −30.0000 | −20.0000 | 20.0000 | 30.0000 |
| L [mm] | 4.1363 | 2.4717 | 2.1643 | 3.6054 |
| y = −10 mm | | | | |
| x [mm] | −30.0000 | −20.0000 | 20.0000 | 30.0000 |
| L [mm] | 17.7989 | 3.2727 | 2.6076 | 4.2396 |

| Sph = +5.0 dpt, Add = 3.0 dpt | | | | |
|---|---|---|---|---|
| y = −5 mm | | | | |
| x [mm] | −30.0000 | −20.0000 | 20.0000 | 30.0000 |
| L [mm] | 4.6985 | 2.8115 | 2.3838 | 3.9886 |
| y = −10 mm | | | | |
| x [mm] | −30.0000 | −20.0000 | 20.0000 | 30.0000 |
| L [mm] | 19.1536 | 3.9888 | 3.0181 | 4.7864 |

3. Spectacle lens according to claim 1, wherein a mean gradient of a trajectory is smaller than a value m given in the following table:

| Sph = −4.0 dpt, Add = 1.0 dpt | | | | |
|---|---|---|---|---|
| y = −5 mm | | | | |
| x [mm] | −30.0000 | −20.0000 | 20.0000 | 30.0000 |
| m | 0.1504 | 0.2091 | −0.2338 | −0.1701 |
| y = −10 mm | | | | |
| x [mm] | −30.0000 | −20.0000 | 20.0000 | 30.0000 |
| m | 0.3796 | 0.5037 | −0.4935 | −0.4012 |

| Sph = −4.0 dpt, Add = 2.0 dpt | | | | |
|---|---|---|---|---|
| y = −5 mm | | | | |
| x [mm] | −30.0000 | −20.0000 | 20.0000 | 30.0000 |
| m | 0.0486 | 0.0601 | 0.0086 | −0.0375 |
| y = −10 mm | | | | |
| x [mm] | −30.0000 | −20.0000 | 20.0000 | 30.0000 |
| m | 0.2906 | 0.4609 | −0.3178 | −0.2642 |

| Sph = −4.0 dpt, Add = 3.0 dpt | | | | |
|---|---|---|---|---|
| y = −5 mm | | | | |
| x [mm] | −30.0000 | −20.0000 | 20.0000 | 30.0000 |
| m | −0.0698 | −0.1448 | 0.2513 | 0.0771 |
| y = −10 mm | | | | |
| x [mm] | −30.0000 | −20.0000 | 20.0000 | 30.0000 |
| m | 0.1408 | 0.3482 | 0.0943 | −0.0701 |

| Sph = 0.5 dpt, Add = 1.0 dpt | | | | |
|---|---|---|---|---|
| y = −5 mm | | | | |
| x [mm] | −30.0000 | −20.0000 | 20.0000 | 30.0000 |
| m | 0.4286 | 0.5223 | −0.8628 | −0.6280 |
| y = −10 mm | | | | |
| x [mm] | −30.0000 | −20.0000 | 20.0000 | 30.0000 |
| m | 0.5658 | 0.5608 | −0.7568 | −0.7614 |

| Sph = 0.5 dpt, Add = 2.0 dpt | | | | |
|---|---|---|---|---|
| y = −5 mm | | | | |
| x [mm] | −30.0000 | −20.0000 | 20.0000 | 30.0000 |
| m | 0.6271 | 0.7017 | −1.2670 | −1.0635 |

-continued

| | y = −10 mm | | | |
|---|---|---|---|---|
| x [mm] | −30.0000 | −20.0000 | 20.0000 | 30.0000 |
| m | 0.6496 | 0.5786 | −0.8596 | −0.9913 |

Sph = 0.5 dpt, Add = 3.0 dpt

| | y = −5 mm | | | |
|---|---|---|---|---|
| x [mm] | −30.0000 | −20.0000 | 20.0000 | 30.0000 |
| m | 0.7248 | 0.7639 | −1.5740 | −1.4026 |
| | y = −10 mm | | | |
| x [mm] | −30.0000 | −20.0000 | 20.0000 | 30.0000 |
| m | 0.6752 | 0.5619 | −0.9717 | −1.1853 |

Sph = +5.0 dpt, Add = 1.0 dpt

| | y = −5 mm | | | |
|---|---|---|---|---|
| x [mm] | −30.0000 | −20.0000 | 20.0000 | 30.0000 |
| m | 0.2821 | 0.3767 | −0.5349 | −0.3554 |
| | y = −10 mm | | | |
| x [mm] | −30.0000 | −20.0000 | 20.0000 | 30.0000 |
| m | −2.0435 | 0.5602 | −0.6714 | −0.5836 |

Sph = +5.0 dpt, Add = 2.0 dpt

| | y = −5 mm | | | |
|---|---|---|---|---|
| x [mm] | −30.0000 | −20.0000 | 20.0000 | 30.0000 |
| m | 0.3463 | 0.4457 | −0.6708 | −0.4628 |
| | y = −10 mm | | | |
| x [mm] | −30.0000 | −20.0000 | 20.0000 | 30.0000 |
| m | −1.8039 | 0.5635 | −0.7148 | −0.6528 |

Sph = +5.0 dpt, Add = 3.0 dpt

| | y = −5 mm | | | |
|---|---|---|---|---|
| x [mm] | −30.0000 | −20.0000 | 20.0000 | 30.0000 |
| m | 0.4117 | 0.5009 | −0.8530 | −0.5979 |
| | y = −10 mm | | | |
| x [mm] | −30.0000 | −20.0000 | 20.0000 | 30.0000 |
| m | −1.5811 | 0.5560 | −0.8075 | −0.7671 |

4. Spectacle lens according to claim 1, wherein a maximum gradient of a trajectory is smaller than a value M given in the following table:

Sph = −4.0 dpt, Add = 1.0 dpt
y = −10 mm

| x [mm] | −30.0000 | −20.0000 | 20.0000 | 30.0000 |
|---|---|---|---|---|
| M | 6.7715 | 0.7457 | −0.4274 | −0.5090 |

Sph = −4.0 dpt, Add = 2.0 dpt
y = −10 mm

| x [mm] | −30.0000 | −20.0000 | 20.0000 | 30.0000 |
|---|---|---|---|---|
| M | 0.2870 | 0.4403 | 0.1951 | −0.3184 |

Sph = −4.0 dpt, Add = 3.0 dpt
y = −10 mm

| x [mm] | −30.0000 | −20.0000 | 20.0000 | 30.0000 |
|---|---|---|---|---|
| M | 0.2179 | −0.0023 | 1.4361 | 13.7067 |

Sph = 0.5 dpt, Add = 1.0 dpt
y = −10 mm

| x [mm] | −30.0000 | −20.0000 | 20.0000 | 30.0000 |
|---|---|---|---|---|
| M | 0.8577 | 0.7249 | −1.1962 | −11.5313 |

Sph = 0.5 dpt, Add = 2.0 dpt
y = −10 mm

| x [mm] | −30.0000 | −20.0000 | 20.0000 | 30.0000 |
|---|---|---|---|---|
| M | 0.9196 | 0.9184 | −1.3399 | −2.8994 |

Sph = 0.5 dpt, Add = 3.0 dpt
y = −10 mm

| x [mm] | −30.0000 | −20.0000 | 20.0000 | 30.0000 |
|---|---|---|---|---|
| M | 1.0969 | 1.0391 | −1.9120 | −4.9332 |

Sph = +5.0 dpt, Add = 1.0 dpt
y = −10 mm

| x [mm] | −30.0000 | −20.0000 | 20.0000 | 30.0000 |
|---|---|---|---|---|
| M | 1.9493 | 6.1058 | −1.9300 | −1.7983 |

Sph = +5.0 dpt, Add = 2.0 dpt
y = −10 mm

| x [mm] | −30.0000 | −20.0000 | 20.0000 | 30.0000 |
|---|---|---|---|---|
| M | 2.8737 | 0.8570 | −2.1444 | −9.0899 |

Sph = +5.0 dpt, Add = 3.0 dpt
y = −10 mm

| x [mm] | −30.0000 | −20.0000 | 20.0000 | 30.0000 |
|---|---|---|---|---|
| M | 0.8090 | 0.7053 | −7.1729 | −7.8544 |

5. Spectacle lens according to claim 1, wherein an x coordinate of a center of the trajectory (half the sum of the minimum and the maximum x coordinate) is smaller than a value xz according to the following table:

Sph = −4.0 dpt, Add = 1.0 dpt

| | y = −5 mm | | | |
|---|---|---|---|---|
| x [mm] | −30.0000 | −20.0000 | 20.0000 | 30.0000 |
| xz [mm] | −11.3070 | −7.5948 | 7.6229 | 11.3708 |
| | y = −10 mm | | | |
| x [mm] | −30.0000 | −20.0000 | 20.0000 | 30.0000 |
| xz [mm] | −11.2191 | −7.5330 | 7.5648 | 11.2896 |

Sph = −4.0 dpt, Add = 2.0 dpt

| | y = −5 mm | | | |
|---|---|---|---|---|
| x [mm] | −30.0000 | −20.0000 | 20.0000 | 30.0000 |
| xz [mm] | −11.3556 | −7.6222 | 7.6442 | 11.4147 |
| | y = −10 mm | | | |
| x [mm] | −30.0000 | −20.0000 | 20.0000 | 30.0000 |
| xz [mm] | −11.3064 | −7.5867 | 7.6028 | 11.3640 |

Sph = −4.0 dpt, Add = 3.0 dpt

| | y = −5 mm | | | |
|---|---|---|---|---|
| x [mm] | −30.0000 | −20.0000 | 20.0000 | 30.0000 |
| xz [mm] | −11.3994 | −7.6451 | 7.6506 | 11.4351 |
| | y = −10 mm | | | |
| x [mm] | −30.0000 | −20.0000 | 20.0000 | 30.0000 |
| xz [mm] | −11.3968 | −7.6411 | 7.6255 | 11.4162 |

-continued

Sph = 0.5 dpt, Add = 1.0 dpt y = −5 mm

| x [mm] | −30.0000 | −20.0000 | 20.0000 | 30.0000 |
|---|---|---|---|---|
| xz [mm] | −13.7030 | −9.1089 | 9.0833 | 13.6540 | y = −10 mm

| x [mm] | −30.0000 | −20.0000 | 20.0000 | 30.0000 |
|---|---|---|---|---|
| xz [mm] | −13.7736 | −9.1541 | 9.1126 | 13.7117 |

Sph = 0.5 dpt, Add = 2.0 dpt y = −5 mm

| x [mm] | −30.0000 | −20.0000 | 20.0000 | 30.0000 |
|---|---|---|---|---|
| xz [mm] | −13.7989 | −9.1581 | 9.1193 | 13.7287 | y = −10 mm

| x [mm] | −30.0000 | −20.0000 | 20.0000 | 30.0000 |
|---|---|---|---|---|
| xz [mm] | −13.9392 | −9.2439 | 9.1778 | 13.8389 |

Sph = 0.5 dpt, Add = 3.0 dpt y = −5 mm

| x [mm] | −30.0000 | −20.0000 | 20.0000 | 30.0000 |
|---|---|---|---|---|
| xz [mm] | −14.0239 | −9.2904 | 9.2212 | 13.9123 | y = −10 mm

| x [mm] | −30.0000 | −20.0000 | 20.0000 | 30.0000 |
|---|---|---|---|---|
| xz [mm] | −14.2516 | −9.4367 | 9.3185 | 14.0854 |

Sph = +5.0 dpt, Add = 1.0 dpt y = −5 mm

| x [mm] | −30.0000 | −20.0000 | 20.0000 | 30.0000 |
|---|---|---|---|---|
| xz [mm] | −17.3295 | −11.3902 | 11.2874 | 17.1168 | y = −10 mm

| x [mm] | −30.0000 | −20.0000 | 20.0000 | 30.0000 |
|---|---|---|---|---|
| xz [mm] | −12.9054 | −11.5804 | 11.4231 | 17.3537 |

Sph = +5.0 dpt, Add = 2.0 dpt y = −5 mm

| x [mm] | −30.0000 | −20.0000 | 20.0000 | 30.0000 |
|---|---|---|---|---|
| xz [mm] | −17.7640 | −11.6405 | 11.5155 | 17.5159 | y = −10 mm

| x [mm] | −30.0000 | −20.0000 | 20.0000 | 30.0000 |
|---|---|---|---|---|
| xz [mm] | −12.8237 | −11.8832 | 11.7004 | 17.8471 |

Sph = +5.0 dpt, Add = 3.0 dpt y = −5 mm

| x [mm] | −30.0000 | −20.0000 | 20.0000 | 30.0000 |
|---|---|---|---|---|
| xz [mm] | −18.2779 | −11.9499 | 11.7829 | 17.9519 | y = −10 mm

| x [mm] | −30.0000 | −20.0000 | 20.0000 | 30.0000 |
|---|---|---|---|---|
| xz [mm] | −12.7057 | −12.2789 | 12.0264 | 18.3631 |

6. Spectacle lens according to claim 1, wherein a y coordinate of a center of a trajectory (half the sum of the minimum and the maximum y coordinate) is smaller than a value yz according to the following table:

Sph = −4.0 dpt, Add = 1.0 dpt y = −5 mm

| x [mm] | −30.0000 | −20.0000 | 20.0000 | 30.0000 |
|---|---|---|---|---|
| yz [mm] | −3.9197 | −3.9560 | −3.9576 | −3.9235 | y = −10 mm

| x [mm] | −30.0000 | −20.0000 | 20.0000 | 30.0000 |
|---|---|---|---|---|
| yz [mm] | −9.7598 | −9.8352 | −9.8493 | −9.7834 |

Sph = −4.0 dpt, Add = 2.0 dpt y = −5 mm

| x [mm] | −30.0000 | −20.0000 | 20.0000 | 30.0000 |
|---|---|---|---|---|
| yz [mm] | −3.9663 | −3.9993 | −3.9887 | −3.9561 | y = −10 mm

| x [mm] | −30.0000 | −20.0000 | 20.0000 | 30.0000 |
|---|---|---|---|---|
| yz [mm] | −9.9049 | −9.9681 | −9.9741 | −9.9176 |

Sph = −4.0 dpt, Add = 3.0 dpt y = −5 mm

| x [mm] | −30.0000 | −20.0000 | 20.0000 | 30.0000 |
|---|---|---|---|---|
| yz [mm] | −4.0196 | −4.0496 | −4.0167 | −3.9821 | y = −10 mm

| x [mm] | −30.0000 | −20.0000 | 20.0000 | 30.0000 |
|---|---|---|---|---|
| yz [mm] | −10.0654 | −10.1113 | −10.0993 | −10.0540 |

Sph = 0.5 dpt, Add = 1.0 dpt y = −5 mm

| x [mm] | −30.0000 | −20.0000 | 20.0000 | 30.0000 |
|---|---|---|---|---|
| yz [mm] | −4.5384 | −4.5218 | −4.5064 | −4.5176 | y = −10 mm

| x [mm] | −30.0000 | −20.0000 | 20.0000 | 30.0000 |
|---|---|---|---|---|
| yz [mm] | −11.3786 | −11.3388 | −11.3147 | −11.3468 |

Sph = 0.5 dpt, Add = 2.0 dpt y = −5 mm

| x [mm] | −30.0000 | −20.0000 | 20.0000 | 30.0000 |
|---|---|---|---|---|
| yz [mm] | −4.6100 | −4.5783 | −4.5450 | −4.5643 | y = −10 mm

| x [mm] | −30.0000 | −20.0000 | 20.0000 | 30.0000 |
|---|---|---|---|---|
| yz [mm] | −11.5798 | −11.5070 | −11.4737 | −11.5325 |

Sph = 0.5 dpt, Add = 3.0 dpt y = −5 mm

| x [mm] | −30.0000 | −20.0000 | 20.0000 | 30.0000 |
|---|---|---|---|---|
| yz [mm] | −4.7552 | −4.7015 | −4.6287 | −4.6610 | y = −10 mm

| x [mm] | −30.0000 | −20.0000 | 20.0000 | 30.0000 |
|---|---|---|---|---|
| yz [mm] | −11.9218 | −11.8067 | −11.7550 | −11.8468 |

Sph = +5.0 dpt, Add = 1.0 dpt y = −5 mm

| x [mm] | −30.0000 | −20.0000 | 20.0000 | 30.0000 |
|---|---|---|---|---|
| yz [mm] | −5.5028 | −5.4121 | −5.3601 | −5.4312 |

-continued

| | y = −10 mm | | | |
|---|---|---|---|---|
| x [mm] | −30.0000 | −20.0000 | 20.0000 | 30.0000 |
| yz [mm] | −18.8206 | −13.7124 | −13.6144 | −13.7883 |

| Sph = +5.0 dpt, Add = 2.0 dpt | | | | |
|---|---|---|---|---|
| | y = −5 mm | | | |
| x [mm] | −30.0000 | −20.0000 | 20.0000 | 30.0000 |
| yz [mm] | −5.7060 | −5.5826 | −5.5047 | −5.6056 |
| | y = −10 mm | | | |
| x [mm] | −30.0000 | −20.0000 | 20.0000 | 30.0000 |
| yz [mm] | −18.9496 | −14.1505 | −14.0444 | −14.2803 |

| Sph = +5.0 dpt, Add = 3.0 dpt | | | | |
|---|---|---|---|---|
| | y = −5 mm | | | |
| x [mm] | −30.0000 | −20.0000 | 20.0000 | 30.0000 |
| yz [mm] | −5.9781 | −5.8024 | −5.6754 | −5.8106 |
| | y = −10 mm | | | |
| x [mm] | −30.0000 | −20.0000 | 20.0000 | 30.0000 |
| yz [mm] | −19.0922 | −14.6873 | −14.5602 | −14.8518 |

7. Spectacle lens according to claim 1, wherein inter- or extrapolated values apply to not listed prescriptions.

\* \* \* \* \*